United States Patent [19]

Reutter et al.

[11] 4,178,569
[45] Dec. 11, 1979

[54] HYBRID FOR TWO-WIRE FULL-DUPLEX TRANSMISSION OF DIGITAL SIGNALS

[75] Inventors: Jörg Reutter, Pleidelsheim; Wolfgang Dietze, Korntal, both of Fed. Rep. of Germany

[73] Assignee: International Standard Electric Corporation, New York, N.Y.

[21] Appl. No.: 888,086

[22] Filed: Mar. 20, 1978

[30] Foreign Application Priority Data

Apr. 2, 1977 [DE] Fed. Rep. of Germany ....... 2714803

[51] Int. Cl.² .............................................. H01P 5/16
[52] U.S. Cl. .............................. 333/119; 179/170 D
[58] Field of Search .................. 333/117, 118, 119, 2, 333/4; 325/5, 12, 15; 343/175; 179/170 D, 170 J

[56] References Cited

U.S. PATENT DOCUMENTS

| B 541,415 | 2/1976 | Ukeiley | 179/170 D |
| 3,982,080 | 9/1976 | Ukeiley | 179/170 D |
| 4,103,118 | 7/1978 | Bergman | 179/170 D |

*Primary Examiner*—Alfred E. Smith
*Assistant Examiner*—Robert E. Wise
*Attorney, Agent, or Firm*—John T. O'Halloran; Alfred C. Hill

[57] ABSTRACT

The hybrid includes a control circuit which automatically matches the impedance of the balancing network to the input impedance of the two-wire line connected to the hybrid. For control, rectified voltages present on the two-wire side and across the balancing network are averaged over time and the mean time values are compared.

11 Claims, 4 Drawing Figures

HYBRID FOR TWO-WIRE FULL-DUPLEX TRANSMISSION OF DIGITAL SIGNALS

BACKGROUND OF THE INVENTION

The present invention relates to a hybrid with a balancing network for connecting a transmitter and a receiver to a two-wire line for full-duplex transmission of digital signals.

Such hybrids are known and may contain transformers or comprise mainly resistors. German Published Pat. application (DT-AS) No. 2,454,108 discloses a resistance bridge hybrid circuit by means of which the transmitter and the receiver are connected to the terminal stations of the two-wire line. One bridge resistance is the input impedance of the two-wire line, and another bridge resistance is the opposite balancing network. To provide optimum isolation between the transmitter and the receiver of the same terminal station so that the terminal's own receiver will not be disturbed while the transmitter is in operation, the line and its balancing network must be matched as accurately as possible. In the known hybrid, this is done by means of an expensive variable balancing network which is manually adjustable for balancing the bridge circuit.

SUMMARY OF THE INVENTION

An object of the present invention is to provide a hybrid for two-wire full-duplex transmission of digital signals which sufficiently isolates the transmitted and received signals from each other by simple means.

A feature of the present invention is the provision of a hybrid with a balancing network for connecting a transmitter and a receiver to a two-wire line having a given impedance for full-duplex transmission of digital signals comprising: a control circuit including first means coupled to the two-wire line to provide a first mean time value of voltage present on the two-wire line; second means coupled to the balancing network to provide a second mean time value of voltage appearing across the balancing network; and thirdmeans coupled to the first and second means to compare the first and second mean time value of voltages to generate a control signal to control the impedance of the balancing network.

It has turned out that the requirements placed on the transhybrid loss for the transmission of digital signals can be met over a wide range of the line impedance with a relatively simple control circuit. The invention thus makes it possible to advance digital communication techniques down to the lowest network level, i.e., to the subscriber, at low cost. The novel hybrid requires no adjustments since it adjusts automatically to the impedance of the respective two-wire line connected thereto.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
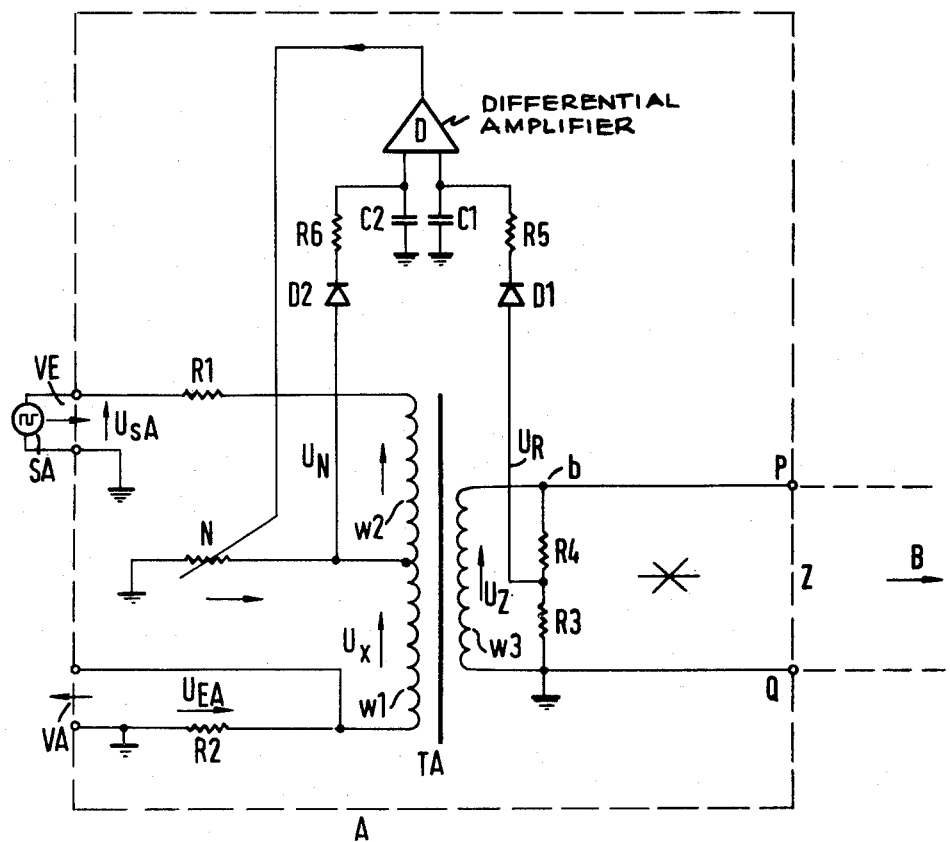
FIG. 1 is a schematic diagram of a first embodiment of a transformer-type hybrid circuit in accordance with the principles of the present invention.

FIG. 1 shows a hybrid circuit which includes a hybrid transformer TA. It has a four-wire input VE, a four-wire output VA, and a two-wire terminal P, Q, to which the two-wire line is connected with the input impedance Z. Hybrid circuits are used in terminal stations of a two-wire transmission path to provide isolation between the transmitter and the receiver when the latter are connected to the two-wire line Z, or in repeaters to separate the two directions of transmission for amplification (hybrid amplifiers). The hybrid circuit shown in FIG. 1 (bordered by broken lines) is used, for example, in a terminal station A of a two-wire transmission path at whose other end a terminal station B is connected.

The transmitted voltage $U_{SA}$ supplied by a source SA is applied to two-wires of the unbalanced four-wire input VE of the hybrid circuit of the terminal station A. The received voltage $U_{EA}$ is taken from two wires of the unbalanced four-wire output VA.

The transmitted voltage $U_{SA}$ reaches the two-wire side via the hybrid transformer TA; between the point b and ground, it has a value $k_1 \cdot U_{SA}$. The transmitter of the other terminal B superimposes on this voltage a voltage which is a function of the voltage $U_{SB}$ generated by this transmitter. The voltage at the point b is, therefore, $$U_Z = f(U_{SB}) + k_1 \cdot U_{SA} \quad (1).$$

Transformed to the other side of the hybrid transformer TA, this gives a voltage across the component winding w1 of $$U_x = (f(U_{SB}) + k_1 \cdot U_{SA}) \cdot \frac{w1}{w3} \quad (2)$$

$$= g(U_{SB}) + k_2 \cdot U_{SA} \quad (3),$$

where w1 and w3 are the numbers of turns of the windings designated by corresponding reference characters.

On the other hand, a voltage $U_N = k_3 \cdot U_{SA}$ appears across the balancing network N; in the case of an equal ratio hybrid, this voltage is independent of the respective input impedance Z of the two-wire line. If it is ensured that $k_3$ is equal to $k_2$, the received voltage $U_{EA}$ taken from the unbalanced four-wire output VA will not be influenced by components of the terminal's own transmitted voltage $U_{SA}$, because $$U_{EA} + U_x - U_N = O, \text{ i.e.,}$$

$$U_{EA} = -g(U_{SB}) - k_2 \cdot U_{SA} + k_3 \cdot U_{SA} \quad (4)$$

This means that the transhybrid loss is at its maximum if $$k_1 \cdot w1/w3 \, U_{SA} = k_3 \cdot U_{SA}. \quad (5)$$

In the hybrid according to the present invention, this equality is established automatically by means of a control circuit as follows.

The transformer winding w3, which has one terminal grounded and across which appears a component $k_1 \cdot U_{SA}$ of the transmitted voltage of this terminal station A (equation (1)) is shunted by two resistors R3 and R4 in series. Resistor R3 has one terminal grounded, and the following relation holds:

$$(R3/R3+R4)=(w1/w3), \qquad (6)$$

i.e., the voltage $U_R$ taken from the junction of resistors R3 and R4 has a component $(w1/w3) \cdot k_1 \cdot U_{SA}$ of the terminal's own transmitted voltage $U_{SA}$. This voltage $U_R$ is now applied through a diode D1 and a resistor R5 to one input of a differential amplifier D. This input is also connected to a capacitor C1 whose other terminal is grounded. The diode D1 rectifies the voltage $U_R$; in the embodiment shown, it passes only the positive components. In an integrator formed by the resistor R5 and the capacitor C1, these positive components are integrated so that a voltage representing a mean time value of the rectified voltage is applied to the input of the differential amplifier D.

Likewise, the voltage $U_N$ applied to the balancing network N is rectified by a diode D2 and integrated in an integrator consisting of a resistor R6 and a capacitor C2 into a mean time value of the rectified voltage $U_N$. The differential amplifier D compares the two mean values so formed and provides at its output a control voltage which is a function of the result of the comparison and controls the impedance of the balancing network so that the two mean values become equal. In this case, according to equation (5), the hybrid circuit is ideally matched; in other words, the impedance of the balancing network N is matched to the two-wire line's input impedance Z effective at the two-wire terminals P and Q. In the best and simplest case, the mean time values formed are arithmetic means. However, root-mean-square values are suitable, too.

It should be mentioned that, for simplicity, the balancing network N is shown as a single, controllable resistance. In practice, the balancing network will be a complex RC network which includes at least one controllable resistance. The controllable resistance can be implemented with conventional diode circuits, transistors or field-effect transistors. The control voltage provided by the differential amplifier D can additionally be used to control a capacitance of this RC network. This is the case in the embodiments described in the following.

Figure 2:
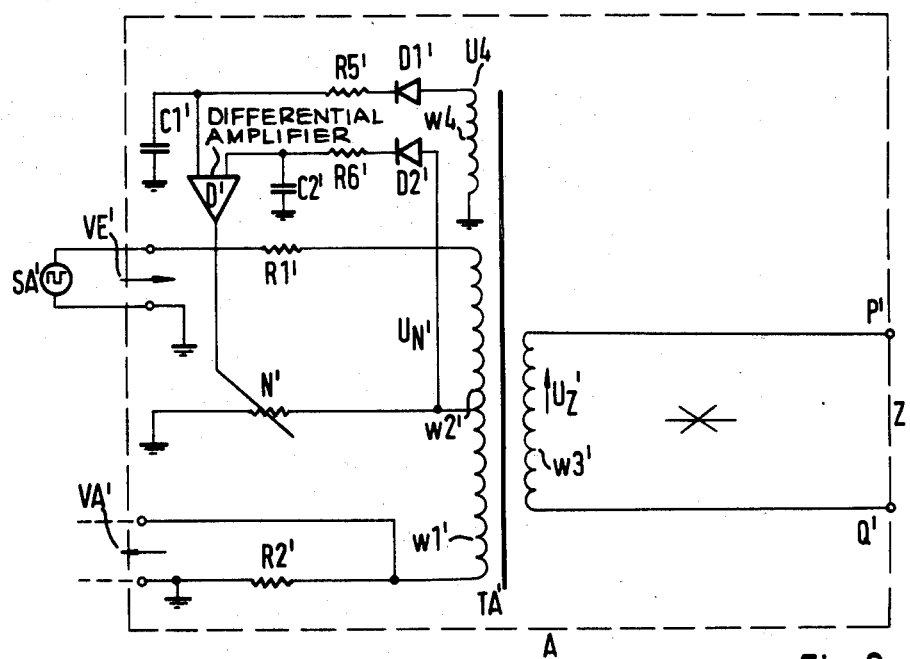
FIG. 2 is a schematic diagram of a second embodiment of a transformer-type hybrid circuit in accordance with the principles of the present invention.

FIG. 2 shows a hybrid which is identical in operation to that of FIG. 1 except that the component $w1/w3 \cdot U_Z$ of the voltage $U_Z$ effective on the two-wire side is tapped by means of an additional transformer winding w4 which has one terminal grounded. The ratio of the number of turns w4 in this transformer winding w4 to the number of turns w3' in the winding w3' located on the two-wire side of the hybrid is the same as that of the number of turns w1' to the number of turns w3', so the voltage across the transformer winding w4 is $$U_4 = (w1'/w3')U_Z = k_1 \cdot w1'/w3' U_{SA} + g'(U_{SA}) \qquad (7).$$

The remainder of this hybrid circuit has already been explained in connection with FIG. 1.

Figure 3:
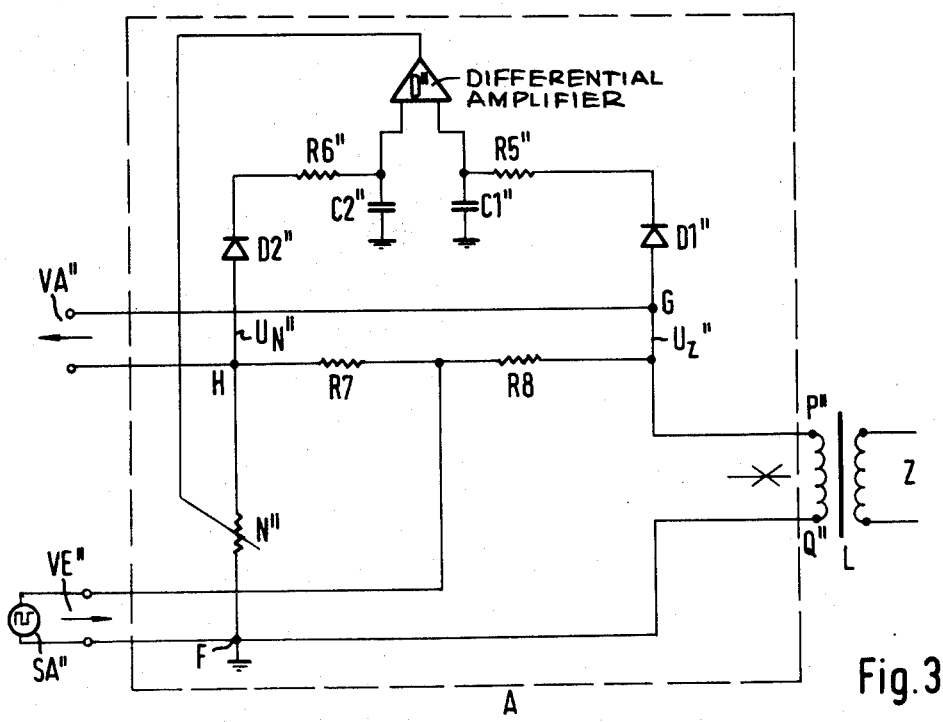
FIG. 3 is a schematic diagram of a resistance bridge hybrid circuit according to the principles of the present invention.

In the embodiment shown in FIG. 3, the hybrid is a resistance bridge hybrid, to be exact a Wheatstone bridge, of the kind referred to under the heading "Background of the Invention".

One bridge resistance is formed by the input impedance Z of the two-wire line connected via a line transformer L, and another bridge resistance is provided by the balancing network N". Connected in series between the two-wire terminal P" and the terminal H of the balancing network N" are bridge resistors R7 and R8. The other terminal F of the balancing network N" is connected to the two-wire terminal Q" and to ground. The terminals of the four-wire input VE" for connection of a voltage source SA" with as low an internal resistance as possible are inserted in the diagonal arm of the bridge between the connection point F and the junction of the bridge resistors R7 and R8. The four-wire output VA" is formed by the connection points H and G.

If the impedance of the balancing network N" and the input impedance Z of the two-wire line are equal and if the bridge is balanced, i.e., if R7 is equal to R8, the received voltage at the four-wire output VA" will not be influenced by the transmitted voltage applied to the four-wire input VE", because the transmitted current will flow in equal shares through the balancing network N" and through the two-wire line. In this case, the points H and G have the same potential. According to the invention, there is provided a control circuit diode D1", resistor R5", capacitor C1", diode D2", capacitor C2", resistor R6", differential amplifier D" which forms the mean time values of voltages derived by rectification from the voltages at the points G and H, compares these mean time values, and adjusts the impedance of the balancing network N" until the mean values are equal, i.e., until the impedance of the balancing network is equal to the input impedance Z of the connected two-wire line. This control circuit is identical to that shown in FIGS. 1 and 2 and, therefore, need not be explained again.

In the foregoing explanation of various embodiments of the invention, the received signal was not considered, i.e., it was assumed that this signal does not influence the mean value of the voltage reaching the two-wire side of the hybrid circuit through the signal transmitted by the terminal's own transmitter, and that this mean value remains constant.

This condition is sufficiently fulfilled in a number of codes for digital signals if these codes are d.c.-free. The latter is ensured by the line transformers inserted in the two-wire transmission path.

An especially suited code is the one explained in the following with the aid of FIG. 4.

Figure 4:
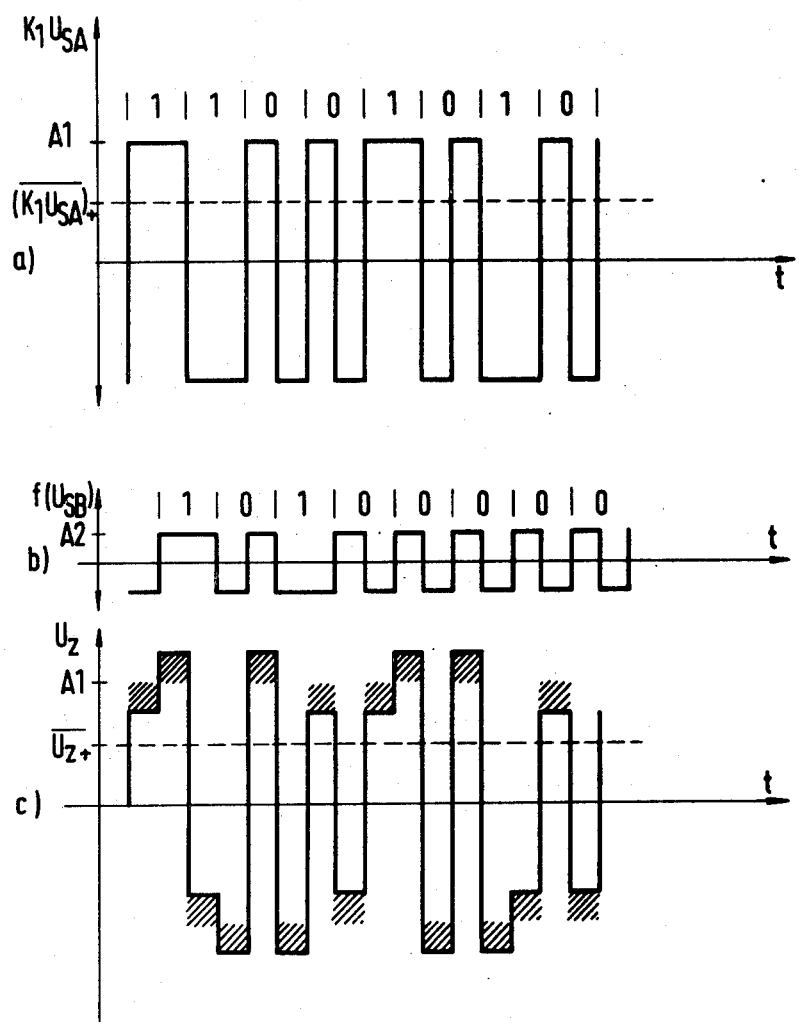
FIG. 4 illustrates a code and its characteristics for which the hybrid according to the present invention is especially suited.

The pulse sequence in curve a), FIG. 4 shows a digital signal 1 1 0 0 1 0 1 0 which is coded in a code referred to in the literature as "conditioned diphase code" or "bi-phase-space code". In this code, there is a zero crossing at the beginning of each bit, and, at each binary "0", an additional zero crossing in the middle of each bit.

It is assumed that the voltage waveform shown in curve a), FIG. 4 is the waveform of that component of the voltage effective on the two-wire side of the hybrid which stems from the terminal's own transmitted voltage, i.e., the voltage $k_1 U_{SA}$, to revert to the example explained with the aid of FIG. 1. Let this voltage have a pulse amplitude A1.

According to equation (1), on the two-wire side of the hybrid, the voltage $U_Z$ also has a component $f(U_{SB})$, which stems from the voltage transmitted by the remote terminal station B. Such a voltage which has a smaller pulse amplitude A2 than the voltage $k_1 U_{SA}$ as a result of the line loss is shown in curve b), FIG. 4. It represents a binary signal sequence 1 0 1 0 0 0 0 0, coded in the same manner. The sum voltage $U_Z$ of the two voltages $k_1 U_{SA}$ and $f(U_{SB})$ according to equation (1) is shown in curve (c), FIG. 4. The hatched areas are the voltage components by which the voltage $k_1 U_{SA}$ was decreased or increased by the summation. As can be easily seen, on an average, the decreases are equal to the increases, so the arithmetic mean of the positive voltage components $U_{Z+}$ of $U_Z$ with respect to time, i.e. $\overline{U_{Z+}}$, is equal to the arithmetic mean of the positive voltage components $(k_1 U_{SA})_+$ of $k_1 U_{SA}$ with respect to time, i.e. $\overline{(k_1 U_{SA})_+}$. As shown in curve a), FIG. 4, this arithmetic mean with respect to time, $\overline{(k_1 U_{SA})_+}$, is equal to one-half the pulse amplitude A1. The same is true for the negative voltage components $U_{Z-}$ and $(k_1 U_{SA})_-$. The code thus has the characteristic that the arithmetic mean with respect to time of the positive or negative components of the voltage effective on the two-wire side of the hybrid is constant and independent of the signal received from the remote terminal.

For the root-mean-square value with respect to time, this applies only with certain limitations, but this averaging method is sufficiently well suited, too.

While we have described above the principles of our invention in connection with specific apparatus it is to be clearly understood that this description is made only by way of example and not as a limitation to the scope of our invention as set forth in the objects thereof and in the accompanying claims.

We claim:

1. A hybrid with a balancing network for connecting a transmitter and a receiver to a two-wire line having a given impedance for full-duplex transmission of digital signals comprising:
   a control circuit including
      first means coupled to said two-wire line to provide a first mean time value of voltage present on said two-wire line;
      second means coupled to said balancing network to provide a second mean time value of voltage appearing across said balancing network; and
      third means coupled to said first and second means to compare said first and second mean time value of voltages to generate a control signal to control the impedance of said balancing network.

2. A hybrid according to claim 1, wherein
said first and second mean time value of voltages are arithmetic mean time values.

3. A hybrid according to claim 2, wherein
said hybrid includes
   a resistance bridge circuit including said given impedance; and
said third means controls the impedance of said balancing network so that said first means coupled to said given impedance provides said first mean time value of voltage equal to said second mean time value of voltage.

4. A hybrid according to claim 2, wherein
said hybrid includes
   a hybrid transformer; and
said third means controls the impedance of said balancing network so that said first and second mean time value of voltages are in a fixed ratio to each other determined by the number of turns of said hybrid transformer.

5. A hybrid according to claim 4, wherein
said first means includes
   an additional transformer winding coupled to said hybrid transformer to provide a voltage having said fixed ratio to provide said first mean time value voltage.

6. A hybrid according to claim 4, wherein
said first means includes
   a voltage divider coupled across said two-wire line to provide a voltage having said fixed ratio to provide said first mean time value voltage.

7. A hybrid according to claim 1, wherein
said first and second mean time value of voltages are root-mean-square mean time values.

8. A hybrid according to claim 7, wherein
said hybrid includes
   a resistance bridge circuit including said given impedance; and
said third means controls the impedance of said balancing network so that said first means coupled to said given impedance provides said first mean time value of voltage equal to said second mean time value of voltage.

9. A hybrid according to claim 7, wherein
said hybrid includes
   a hybrid transformer; and
said third means controls the impedance of said balancing network so that said first and second mean time value of voltages are in a fixed ratio to each other determined by the number of turns of said hybrid transformer.

10. A hybrid according to claim 9, wherein
said first means includes
   an additional transformer winding coupled to said hybrid transformer to provide a voltage having said fixed ratio to provide said first mean time value voltage.

11. A hybrid according to claim 9, wherein
said first means includes
   a voltage divider coupled across said two-wire line to provide a voltage having said fixed ratio to provide said first mean time value voltage.

* * * * *